US009766323B2

(12) United States Patent
Liu

(10) Patent No.: US 9,766,323 B2
(45) Date of Patent: Sep. 19, 2017

(54) METHOD FOR TERMINAL POSITIONING, BASE STATION AND USER EQUIPMENT

(71) Applicant: Huawei Technologies Co., Ltd., Shenzhen (CN)

(72) Inventor: Jinnan Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 291 days.

(21) Appl. No.: 14/624,162

(22) Filed: Feb. 17, 2015

(65) Prior Publication Data

US 2015/0198696 A1   Jul. 16, 2015

Related U.S. Application Data

(63) Continuation of application No. PCT/CN2013/079312, filed on Jul. 12, 2013.

(30) Foreign Application Priority Data

Aug. 20, 2012   (CN) .......................... 2012 1 0296773

(51) Int. Cl.
*H04W 4/00*       (2009.01)
*G01S 5/10*       (2006.01)
(Continued)

(52) U.S. Cl.
CPC   *G01S 5/10* (2013.01); *G01S 1/20* (2013.01); *G01S 5/0221* (2013.01);
(Continued)

(58) Field of Classification Search
CPC . H04L 5/0048; H04L 5/00; G01S 5/06; G01S 1/20; G01S 5/0236; G01S 5/10; G01S 5/0221; H04W 64/00; Y02B 60/50
See application file for complete search history.

(56) References Cited

U.S. PATENT DOCUMENTS

2010/0272032 A1   10/2010   Sayana et al.
2011/0176499 A1   7/2011    Siomina et al.
(Continued)

FOREIGN PATENT DOCUMENTS

CN   102143578 A   8/2011
CN   102415176 A   4/2012
(Continued)

OTHER PUBLICATIONS

Lte, "3rd Generation Partnership Project; Technical Specification Group Radio Access Network; Evolved Universal Terrestrial Radio Access (E-UTRA); Physical Channels and Modulation" (Release 10) 3GPP TS 36.211, V10.5.0, Jun. 2012, 101 pages.

*Primary Examiner* — Yemane Mesfin
*Assistant Examiner* — Abdelillah Elmejjarmi
(74) *Attorney, Agent, or Firm* — Brinks Gilson & Lione

(57) ABSTRACT

The present invention relates to a method for terminal positioning. The method comprises: generating cell-specific reference signals CRSs, and transmitting the CRSs on one or more ports used for transmitting the CRSs; generating a positioning reference signal PRS, and transmitting the PRS on one of the one or more ports used for transmitting the CRSs. The method for terminal positioning provided by the embodiment of the present invention can reduce an impact caused by the limited number of symbols for transmitting the PRS, and increase the number of reference signal symbols available for positioning within a subframe, thereby reducing an impact of a secondary peak and enhancing the energy of a primary peak.

8 Claims, 5 Drawing Sheets

(51) Int. Cl.
  *H04W 64/00* (2009.01)
  *G01S 5/02* (2010.01)
  *G01S 5/06* (2006.01)
  *G01S 1/20* (2006.01)
  *H04L 5/00* (2006.01)

(52) U.S. Cl.
  CPC .............. *G01S 5/0236* (2013.01); *G01S 5/06* (2013.01); *H04L 5/0048* (2013.01); *H04W 64/00* (2013.01)

(56) References Cited

U.S. PATENT DOCUMENTS

| | | |
|---|---|---|
| 2012/0182951 A1 | 7/2012 | Okubo et al. |
| 2012/0184302 A1 | 7/2012 | Kazmi et al. |
| 2012/0231809 A1* | 9/2012 | Siomina ................ H04W 64/00 455/456.1 |
| 2013/0022096 A1* | 1/2013 | Kazmi ................ H04L 27/2602 375/224 |

FOREIGN PATENT DOCUMENTS

| | | | | |
|---|---|---|---|---|
| CN | 102474725 A | 5/2012 | | |
| EP | 2409464 A1 | 1/2012 | | |
| EP | 2 434 710 A1 | 3/2012 | | |
| EP | 2 797 347 A1 | 10/2014 | | |
| SE | WO2011129734 A1 * | 10/2011 | ............. | H04L 27/26 |
| SE | WO2011139201 A1 * | 11/2011 | ............ | H04W 64/00 |
| WO | WO 2010/090776 A1 | 8/2010 | | |
| WO | WO 2010/124448 A1 | 11/2010 | | |
| WO | WO 2014/131349 A1 | 9/2014 | | |

\* cited by examiner

METHOD FOR TERMINAL POSITIONING, BASE STATION AND USER EQUIPMENT

CROSS-REFERENCE TO RELATED APPLICATIONS

This application is a continuation of International Application No. PCT/CN2013/079312, filed on Jul. 12, 2013, which claims priority to Chinese Patent Application No. 201210296773.X, filed on Aug. 20, 2012, both of which are hereby incorporated by reference in their entireties.

TECHNICAL FIELD

The present invention relates to the field of communications technologies, and in particular, to a method for terminal positioning, a base station and a user equipment.

BACKGROUND

In the technology of long term evolution (Long Term Evolution, LTE), transmitting a positioning reference signal (Positioning Reference Signal, PRS) is proposed to implement a positioning technology of observation time difference of arrival (Observation Time Difference of Arrival, OTDOA), and its application architecture is shown as in FIG. 1. An OTDOA positioning system includes three kinds of devices which are a base station, a terminal and a network side positioning server. The OTDOA positioning technology is a positioning method assisted by a terminal, namely, the terminal performs measurement of a reference signal arrival time difference (Reference Signal Time Difference, RSTD), and the network side positioning server estimates a position of a UE according to the RSTD measurement result.

Multiple base stations transmit positioning reference signal subframes (Positioning Reference Signal Subframe) for terminal positioning. This time interval is called a PRS measurement occasion, one PRS measurement occasion includes one or more positioning reference signal subframes (Positioning Reference Signal Subframe).

The network side positioning server transmits a measuring assisting message to notify the terminal of configuration for each base station to transmit the positioning reference signal subframes.

According to the assisting message, the terminal receives downlink subframe signals transmitted by each base station in the PRS measurement occasion, measures a PRS reference signal arrival time difference (Reference Signal Time Difference, RSTD) of the PRS subframes transmitted by each base station and reports to the network side. The network side performs a hyperbolic positioning according to the RSTD, and obtains an estimated position of the terminal.

Through measurement, the PRS received by the UE is correlated with a local PRS, and the RSTD is obtained according to the location of a correlation peak. Whether a correct location of the correlation peak can be obtained is impacted by an autocorrelation characteristic of the PRS, and the impact increases as the number of the PRS within the positioning reference signal subframe increases, and also increases as the number of the positioning reference signal subframe increases. Therefore, the detection probability of the RSTD measurement is limited by the number of PRS reference signal symbols available for measurement within a subframe. However, the PRS is a newly introduced reference signal in R9, the protocol stipulates that the positioning reference signal should be compatible with R8 design. The PRS cannot be transmitted on symbols occupied by cell-specific reference signals (Cell-Specific Reference Signal, CRS). The number of the reference signal symbols available for measurement is limited, and thereby the detection probability of the RSTD measurement is constrained.

SUMMARY

The present invention provides a method for terminal positioning, so as to solve the problem in the prior art that when positioning a terminal, the number of positioning reference signal PRS symbols is relatively small and the detection probability of the RSTD measurement is impacted.

In one aspect, an embodiment of the present invention provides a method for terminal positioning, and the method includes:

generating cell-specific reference signals (CRSs), and transmitting the CRSs on one or more ports used for transmitting the CRSs;

generating a positioning reference signal (PRS), and transmitting the PRS on one of the one or more ports used for transmitting the CRSs.

In another aspect, an embodiment of the present invention provides a method for terminal positioning, and the method includes:

receiving a positioning reference signal subframe, where the positioning reference signal subframe comprises CRSs transmitted on one or more ports used for transmitting the CRSs and a PRS transmitted on one of the one or more ports used for transmitting the CRSs;

generating a local PRS and a local CRS which are transmitted within a PRS bandwidth on the port;

correlating the received PRS with the local PRS to obtain a first correlation value, correlating the received CRSs with the local CRS to obtain a second correlation value, and performing measurement of a reference signal time difference according to the first correlation value and the second correlation value.

In another aspect, an embodiment of the present invention provides a base station, which includes:

a signal generating unit, configured to generate cell-specific reference signals (CRSs), and a positioning reference signal (PRS);

a signal transmitting unit, configured to transmit the CRSs on one or more ports used for transmitting the CRSs, and transmit the PRS on one of the one or more ports used for transmitting the CRSs.

In another aspect, an embodiment of the present invention also provides a user equipment, which includes:

a receiving unit, configured to receive a positioning reference signal subframe transmitted by a base station, where the positioning reference signal subframe includes CRSs transmitted on one or more ports used for transmitting the CRSs, and a PRS transmitted on one of the one or more ports used for transmitting the CRSs;

a local signal generating unit, configured to generate a local PRS and a local CRS which are transmitted within a PRS bandwidth on the port;

an operating unit, configured to correlate the received PRS with the local PRS to obtain a first correlation value, correlate the received CRSs with the local CRS to obtain a second correlation value, and perform measurement of a reference signal time difference according to the first correlation value and the second correlation value.

In another aspect, an embodiment of the present invention also provides a base station, which includes:

a base band processing unit, configured to perform base band signal processing, and execute:

generating cell-specific reference signals (CRSs);

generating a positioning reference signal (PRS);

a radio frequency front end and an antenna, configured to modulate a base band signal to a carrier frequency and transmit on an antenna port, and execute:

transmitting the CRSs on one or more ports used for transmitting the CRSs;

transmitting the PRS on one of the one or more ports used for transmitting the CRSs.

In another aspect, an embodiment of the present invention also provides a user equipment, which includes:

a radio frequency front end and an antenna, configured to demodulate a signal received on a receiving antenna port to a base band signal, and execute:

receiving a positioning reference signal subframe, where the positioning reference signal subframe includes CRSs transmitted on one or more ports used for transmitting the CRSs, and a PRS transmitted on one of the one or more ports used for transmitting the CRSs;

a base band processing unit, configured to perform base band signal processing, and execute:

generating a local PRS and a local CRS which are transmitted within a PRS bandwidth on the port;

correlating the received PRS with the local PRS to obtain a first correlation value, correlating the received CRSs with the local CRS to obtain a second correlation value, and performing measurement of a reference signal time difference according to the first correlation value and the second correlation value, The embodiments of the present invention provide a method for terminal positioning, thorough limiting, by a base station, that the port used for transmitting a CRS and the port used for transmitting a PRS are the same port, the receiving terminal is enabled to accumulate correlation values of received CRS and PRS on each symbol coherently, where a CRS and a PRS are transmitted by the base station on a corresponding antenna port, reducing the impact caused by the limited number of symbols for transmitting the PRS, and increasing the number of reference signal symbols available for positioning within a subframe, thereby reducing an impact of a secondary peak and enhancing the energy of a primary peak.

BRIEF DESCRIPTION OF DRAWINGS

To illustrate technical solutions in embodiments of the present invention more clearly, the accompanying drawings required for describing the embodiments are briefly introduced in the following. Apparently, the accompanying drawings in the following description show merely some embodiments of the present invention, and persons of ordinary skill in the art may still derive other drawings according to these accompanying drawings without creative efforts.

DESCRIPTION OF EMBODIMENTS

The following further describes the technical solutions of the present invention in details with reference to the accompanying drawings and embodiments of the present invention.

In OTDOA positioning technology, since a PRS is a newly introduced reference signal in R9, the protocol stipulates that the positioning reference signal should be compatible with R8 design. The PRS cannot be transmitted on symbols occupied by cell-specific reference signals (Cell-Specific Reference Signal, CRS). In addition, in order to improve a correlation characteristic of the positioning reference signal, according to the protocol, there is no data load on symbols for an outside control channel within a PRS bandwidth, namely, within the PRS bandwidth, no data is transmitted other than several kinds of reference signals which are primary synchronization signal (Primary Synchronization Signal, PSS), secondary synchronization signal (Secondary Synchronization Signal, SSS), CRS and PRS.

Figure 2:
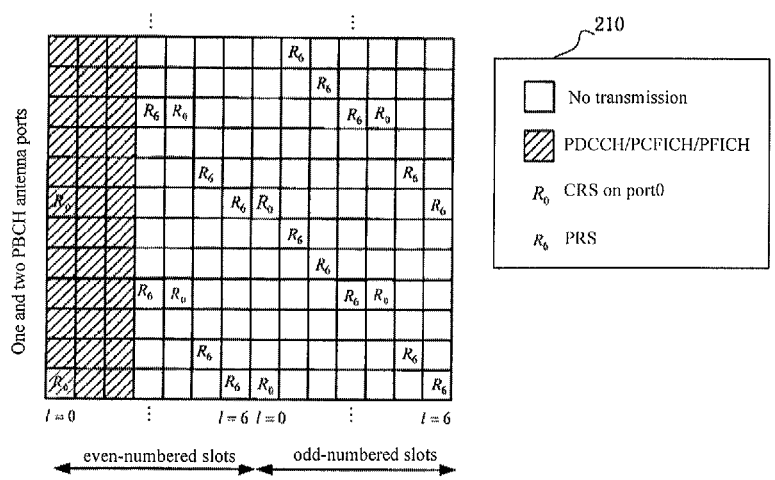
FIG. 2 is a symbol correspondence diagram of a CRS and a PRS in a normal subframe.

As shown in FIG. 2, at present, the transmission of the positioning reference signal PRS must avoid symbols for the control channel and CRSs, therefore, within a subframe which includes fourteen OFDM symbols for a normal subframe or twelve OFDM symbols for an extended subframe, four symbols are occupied when using one or two antennas of PORT0~PORT1 to transmit the CRSs, six symbols are occupied by antenna ports PORT0~PORT3 when using four antennas to transmit the CRSs, the control channel occupies the first three symbols, one symbol of which is the same symbol as CRSs, i.e. symbol 0. Therefore, in a subframe, symbols that can be used for transmitting the PRS on PORT6 are eight, seven, six or five OFDM symbols. Therefore, the correlation of the positioning reference signal is limited by the number of symbols available for transmitting the PRS in a subframe. Legend 210 illustrates reference signals shown in FIG. 2: PRS, CRS, physical control format indicator channel PCFICH, physical downlink control channel (PDCCH), and physical hybrid-ARQ indicator channel PHICH, the three channels are control channels.

Therefore, the basic idea of the embodiments in the present invention is to transmit the PRS on a port used for transmitting a CRS, so that a terminal can accumulate received positioning reference signal subframes coherently, and the number of reference signal symbols available for positioning in a subframe is increased.

Figure 1:
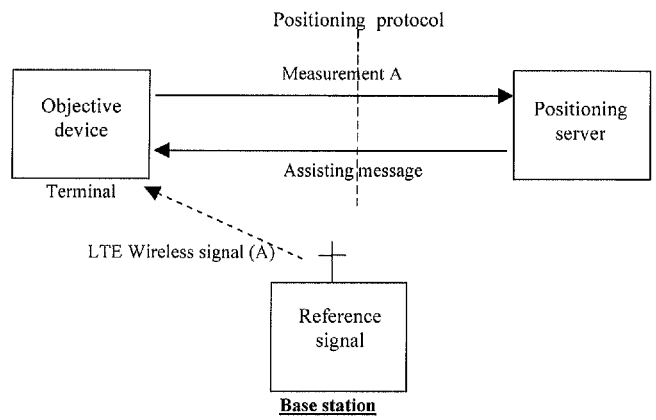
FIG. 1 is a system architecture diagram of a method for terminal positioning.
Figure 3:
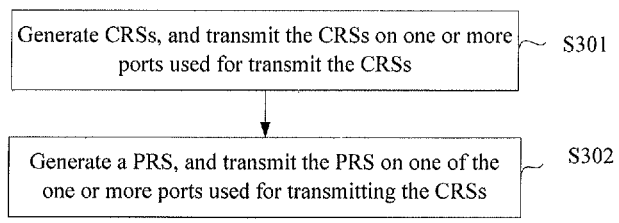
FIG. 3 is a flowchart of a method for terminal positioning according to an embodiment of the present invention.

FIG. 3 is a flowchart of a method for terminal positioning according to an embodiment of the present invention, the executive entity of this embodiment is a base station in a communication system, such as the base station 102 in FIG. 1, as shown in the figure, the method includes:

S301, generate cell-specific reference signals CRSs, and transmit the CRSs on one or more ports used for transmitting the CRSs.

Specifically, in this step, the generating the CRSs refers to generate an orthogonal frequency division multiplexing OFDM symbol containing the CRSs, and then, the symbol containing the CRSs are transmitted on one or more ports used for transmitting the CRSs.

More specifically, in a protocol 3GPP TS 36.211, the symbol number l occupied by CRSs in a subframe is given by the following equation, p represents an antenna port, $N_{symb}^{DL}$ represents the number of symbols included in a time slot, which is 7 for a normal subframe and 6 for an extended subframe. The first three symbols of an even time slot is a control region, namely, #0, #1, #2 are a control channel region used for transmitting control channel information.

$$l = \begin{cases} 0, N_{symb}^{DL} - 3 & \text{if } p \in \{0, 1\} \\ 1 & \text{if } p \in \{2, 3\} \end{cases}$$

The base station correspondingly generates a scrambling sequence of the CRSs according to a physical cell identification (Physical Cell Identification, PCID), a time slot number $n_s$, a symbol l in the time slot, and a port number p, after performing QPSK modulation to the generated scrambling sequence, the base station maps QPSK symbols to resource elements (Resource Element, RE) according to different antenna port numbers, and transforms the resource elements into a time domain by Fourier inversion, and adds a cyclic prefix (Cyclic Prefix, CP) to generate an OFDM symbol.

In an OFDM symbol, besides reference signals, REs on a control channel and a data channel also need to be mapped. For the CRSs, the REs on the control channel and the data channel which are outside the PRS bandwidth need to be mapped. After mapping, OFDM symbols containing a CRS are transmitted on a port corresponding to the CRS.

In brief, if the CRS is transmitted on one antenna port, then p=0, which represents port0, if the CRSs are transmitted on two antenna ports, then p=0,1, respectively corresponding to two antenna ports port0 and port1. If the CRSs are transmitted on four antenna ports, then p=0,1,2,3, respectively corresponding to four antenna ports port0, port1,port2 and port3.

S302, generate a positioning reference signal PRS, and transmit the PRS on one of the one or more ports used for transmitting the CRSs.

Specifically, generating the PRS refers to generate an orthogonal frequency division multiplexing OFDM symbol containing the positioning reference signal PRS, and the symbol containing the PRS is transmitted on one of the one or more ports used for transmitting the CRSs.

Specifically, in the protocol 3GPP TS 36.211, the symbol number l occupied by the PRS in a subframe is given by the following equation, $n_s$ represents a time slot number, and the transmitted symbols are eight, seven, six or five OFDM symbols according to different number of antenna ports for transmitting a PBCH (Physical Broadcast Channel) and different subframe type. The antenna port for transmitting the PBCH and the port for transmitting the CRSs are the same.

For a normal subframe:

$$l = \begin{cases} 3, 5, 6 & \text{if } n_s \bmod 2 = 0 \\ 1, 2, 3, 5, 6 & \text{if } n_s \bmod 2 = 1 \text{ and} \\ & (1 \text{ or } 2 \text{ PBCH antenna ports}) \\ 2, 3, 5, 6 & \text{if } n_s \bmod 2 = 1 \text{ and} \\ & (4 \text{ PBCH antenna ports}) \end{cases}$$

For an extended subframe:

$$l = \begin{cases} 4, 5 & \text{if } n_s \bmod 2 = 0 \\ 1, 2, 4, 5 & \text{if } n_s \bmod 2 = 1 \text{ and} \\ & (1 \text{ or } 2 \text{ PBCH antenna ports}) \\ 2, 4, 5 & \text{if } n_s \bmod 2 = 1 \text{ and} \\ & (4 \text{ PBCH antenna ports}) \end{cases}$$

The base station correspondingly generates a scrambling sequence of the PRS according to a physical cell identification (Physical Cell Identification, PCID), the time slot number and a symbol number in the time slot, and after performing QPSK modulation to the generated scrambling sequence, the base station maps QPSK symbols to resource elements (Resource Element, RE), transforms the resource elements into the time domain by the Fourier inversion, and adds a cyclic prefix to generate an OFDM symbol.

Since the resource mapping of the PRS is irrelevant to the port number, the resource mapping can be performed in a condition of not knowing the port.

In an OFDM symbol, besides reference signals, REs on a control channel and a data channel also need to be mapped. For the PRS, the REs on the data channel which is outside the PRS bandwidth also need to be mapped. After mapping, OFDM symbols containing the PRS are transmitted on a port of the CRSs With regard to which CRS port is selected to transmit the PRS, the base station and the terminal may define which port is used for transmission in advance, and may also select in a dynamic configuration way, when selecting a port used for transmitting the PRS by using dynamic configuration, a measuring assisting message needs to be sent from a network side to the UE, to indicate to the user equipment a correspondence between the selected transmission port and the port for transmitting the CRS. For example, indicating that the antenna port for transmitting the PRS is port0.

In brief, the base station and the terminal may make an agreement in advance to use port0 to transmit the PRS.

If the port for transmitting the PRS is dynamically configured, it needs to be determined according to the current number of antennas used for transmitting CRS, if the CRS is transmitted on one antenna port, only port0 can be configured, if the CRSs are transmitted on two antenna ports, one of the two antenna ports, port0 or port1, can be configured. If the CRSs are transmitted on four antenna ports, one of the four antenna ports, port0, port1, port2 and port3, can be configured.

However, in a subframe, the number of OFDM symbols for the CRSs on port0 and port1 is relatively large, therefore, when the CRS is transmitted on one antenna port, port0 can be optionally adopted to transmit the PRS. When the CRS is transmitted on two or four antenna ports, in addition to optionally adopting port0 to transmit the PRS, port1 also can be selected to transmit the PRS.

It should be noted that, there is no sequential relationship between S301 and S302 in this embodiment, and the description is given in the aforementioned sequence only for the convenience of illustration.

In the embodiment, since the PRS is transmitted on a port used for transmitting a CRS, therefore, the UE can use three OFDM symbols of the CRS in the outside control channel and five to eight OFDM symbols of the PRS for RSTD measurement, thereby increasing the correlation of the reference signal.

Figure 4:
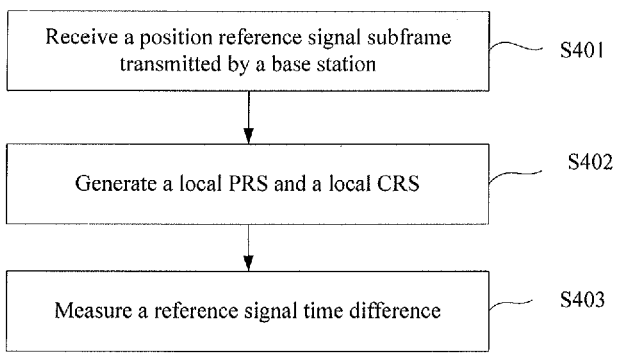
FIG. 4 is a flowchart of a method for terminal positioning according to another embodiment of the present invention.

FIG. 4 is a flowchart of a method for terminal positioning according to another embodiment of the present invention, the executive entity of this embodiment is a user equipment, such as UE116 or UE122 in FIG. 1, and the method includes:

Step S401, receive a positioning reference signal subframe;

Specifically, receive one or more positioning reference signal subframes transmitted by multiple base stations included in a PRS measurement occasion of this time.

In the positioning reference signal subframe, as same as other subframes, a control channel and a data channel are also included. Different from a common subframe, the positioning reference signal subframe not only includes CRS, but also includes PRS.

Specifically, the positioning reference signal subframe includes an OFDM symbol of a PRS transmitted on a port used for transmitting a CRS, and an OFDM symbol of CRSs transmitted on one or more ports used for transmitting the CRSs.

In a PRS occasion, a UE receives a PRS and a CRS transmitted by a positioning base station on a same port, including multiple subframes, each subframe includes an OFDM symbol carrying the CRS and an OFDM symbol carrying the PRS.

Step S402, generate a local PRS and a local CRS which are transmitted within a PRS bandwidth on the port.

Specifically, before receiving the PRS and the CRSs transmitted by the base station, or at the same time of receiving the PRS and the CRSs, the UE also generates local reference signals, i.e. the local PRS and the local CRS.

The generation of the local CRS is to only generate multiple OFDM symbols which are within the PRS bandwidth and on the port corresponding to the PRS. First, determine an OFDM symbol l within the subframe according to a port number, generate a scrambling code, perform QPSK modulation to the scrambling code, perform resource mapping according to the port number, and then obtain a time domain signal through IFFT. The local CRS may be with a CP or without a CP.

Similar to the generation of the local CRS, the generation of the PRS is also merely for one port. The method for generating the local PRS is to generate a scrambling code at first, perform QPSK modulation to the scrambling code, perform resource mapping according to the port number, and then obtain a time domain signal through IFFT. The local PRS may be with a CP or without a CP.

Since the CRS and the PRS both adopt the same gold sequence, and the initial value of the gold is obtained using a same method, so the CRS and the PRS may use a same scrambling code generating unit to which corresponding time slot numbers and symbol numbers in the time slots are inputted, to generate scrambling sequences on different symbols.

Before this step, if the base station dynamically configures the transmission port, then the UE may also need to receive a measuring assisting message sent by the base station, so as to acquire the port on which the base station transmits the PRS and the CRS according to the measuring assisting message, where the port is port0, port1, port2 or port3, and to generate the local CRS of a corresponding port according to the different ports.

Then, executing step S403, correlate the received PRS with the local PRS to obtain a first correlation value, and correlate the received CRSs with the local CRS to obtain a second correlation value, and perform measurement of a reference signal time difference according to the first correlation value and the second correlation value.

Figure 5:
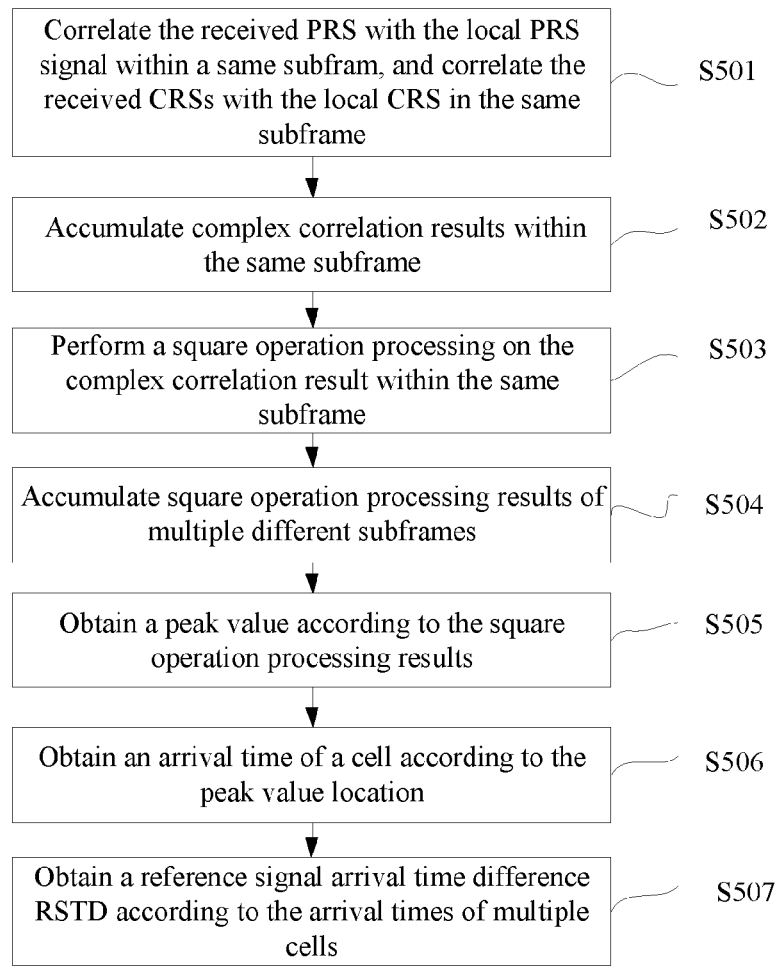
FIG. 5 is a flowchart of correlation and combination by a receiving terminal in a method for terminal positioning according to an embodiment of the present invention.

More specifically, regarding the correlating the received CRSs with the local CRS to obtain a second correlation value and performing measurement of a reference signal time difference according to the first correlation value and the second correlation value, reference can be made to FIG. 5, which includes:

S501, correlate the received PRS with the local PRS within a same subframe, and correlate the received CRSs with the local CRS within the same subframe;

If the generated local CRS and PRS have CPs, then, in the correlation operation, the corresponding received signals are also with CPs, to ensure that the two operands of the correlation operation have an equal length, and vice versa.

S502, accumulate a complex correlation result within the same subframe;

Since received signals and local signals are all complex numbers, then the results obtained after the correlation operation are also complex numbers. The complex correlation results within a subframe are accumulated coherently, that is, the first correlation result and the second correlation result are added correspondingly.

S503, perform a square operation processing to the complex correlation result within the same subframe;

After accumulating the complex correlation results of the first correlation result and the second correlation result, the square operation is performed and a real correlation result is obtained.

S504, accumulate square operation processing results of multiple different subframes;

If the positioning reference signal measurement occasion of this time includes multiple positioning reference signal subframes, then the real correlation results of different positioning reference signal subframes are accumulated.

S505, obtain a peak value location according to the square operation processing results;

Search for the peak value location of the correlation results in the positioning reference signal measurement occasion of this time.

S506, obtain an arrival time of a cell according to the peak value location;

The peak value location can be taken as a subframe arrival time of the positioning reference signal of a corresponding base station, and a first path arrival time also can be estimated according to this peak value location.

S507, obtain a reference signal arrival time difference RSTD according to the arrival times of multiple cells.

Repeating steps S501~507 to obtain the arrival times of multiple cells, calculate an arrival time difference to a reference cell thereof, namely, the reference signal arrival time difference RSTD.

In step S403, a part of the received CRSs transmitted in an outside control channel region is correlated with a part of the local CRS transmitted in the outside control channel region, to obtain the second correlation value.

As for the outside control channel region, three OFDM symbols on the port port0 or port1 of the CRS are included, which are, for a normal subframe, symbol #4 in an even time slot and symbols #0 and #4 in an odd time slot, while for an extended subframe, symbol #3 in the even time slot and symbols #0 and #3 in the odd time slot. As for ports port2 and port3 of the CRSs, one OFDM symbol, namely, symbol #1 in the odd time slot.

In the embodiment, since the PRS occupies the symbols within a subframe outside a control channel except the symbols occupied by the CRS, and is transmitted on the same port as a CRS, therefore, the UE performs correlation operation on the three OFDM symbols of the CRS in the outside control channel and the five to eight OFDM symbols of the PRS, and thereby signal correlation is increased.

Figure 6:
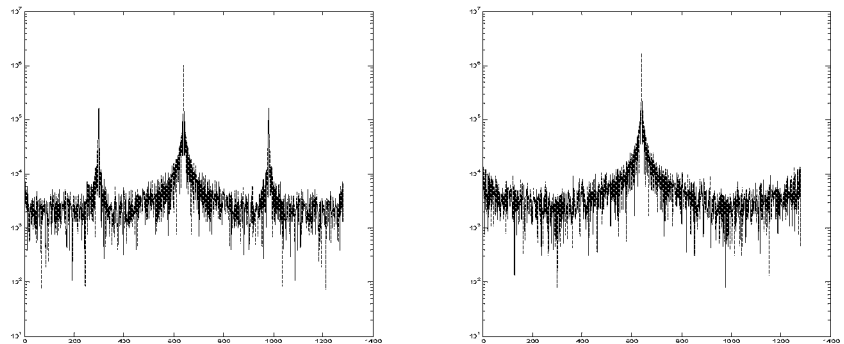
FIG. 6 is an effect contrast diagram of a method for terminal positioning according to an embodiment of the present invention.

FIG. 6 shows signal correlation characteristics within a subframe in a condition that powers and bandwidths of the PRS and the CRS are assumed to be the same, where the subframe is a normal subframe, the CRS is transmitted on one antenna port, the PRS is transmitted on port0. It can be seen from the left figure that there is apparent secondary peaks in the correlation window, but after the combination of the CRS and the PRSs, the energy of the secondary peaks obviously decreases, and the energy of the primary peak increases by a relevant energy of three CRS symbols.

Figure 7:
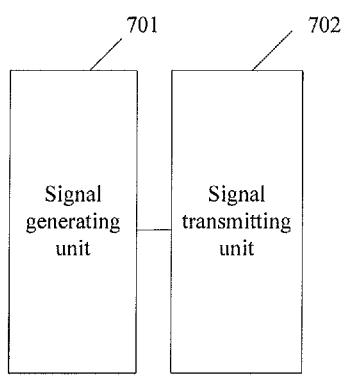
FIG. 7 is a structural diagram of a base station according to an embodiment of the present invention.

Correspondingly, the embodiment of the present invention provides a base station, and the structure of the base station is shown as FIG. 7, which includes:

A signal generating unit 701 which generates cell-specific reference signals CRS, and a positioning reference signal PRS;

A signal transmitting unit 702 which transmits the CRSs on one or more ports used for transmitting the CRSs, and transmits the PRS on one of the one or more ports used for transmitting the CRS.

However, it should be noted that, the base station is used to implement the method for terminal positioning described in the embodiment according to FIG. 3, where each unit is merely divided according to its logical functions, but is not limited to the aforementioned division, as long as corresponding functions can be implemented; besides, the specific names of the functional units are intended to distinguish them from each other, rather than to limit the protection scope of the present invention.

Figure 8:
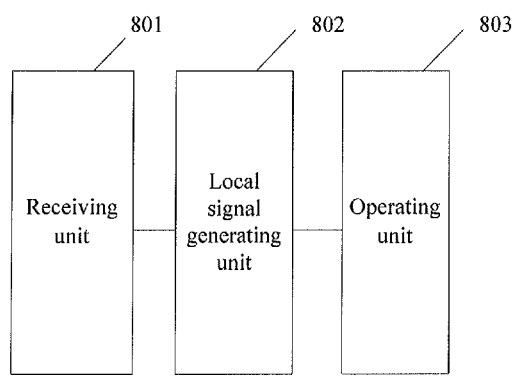
FIG. 8 is a structural diagram of a user equipment according to an embodiment of the present invention.

Correspondingly, the embodiment of the present invention also provides a user equipment, and the structure of the user equipment is shown as FIG. 8, which includes:

A receiving unit 801, configured to receive a positioning reference signal subframe transmitted by a base station, where the positioning reference signal subframe includes a PRS transmitted on a port used for transmitting a CRS, and CRSs transmitted on one or more ports used for transmitting the CRSs.

Since multiple base stations may transmit the positioning reference signal subframe in a positioning reference signal measurement occasion, then the user equipment may receive the positioning reference signal transmitted by multiple base stations.

A local signal generating unit 802, configured to generate a local PRS and a local CRS which are transmitted within a PRS bandwidth on the port;

The terminal may process the generation of the local PRS and CRS of the multiple base stations serially or parallel.

And an operating unit 803, configured to correlate the received PRS with the local PRS to obtain a first correlation value, correlate the received CRSs with the local CRS to obtain a second correlation value, and perform measurement of a reference signal time difference according to the first correlation value and the second correlation value.

The user equipment may serially or parallel process the correlation of the PRS received from the multiple base stations with the local PRS to obtain the first correlation values, and the correlation of the received CRSs with the local CRS to obtain the second correlation values. Obtain the arrival times of multiple cells, calculate an arrival time difference to a reference cell thereof, namely, the reference signal arrival time difference RSTD.

In addition, the user equipment may also include an assisting receiving unit, which is configured to receive a measuring assisting message sent from a network side, for acquiring, according to the measuring assisting message, a correspondence between a port for transmitting the PRS and a port of the one or multiple transmitting the CRSs of a base station.

However, it should be noted that, the user equipment is used to implement the method for terminal positioning described in the embodiment according to FIG. 4, where each unit is merely divided according to its logical functions, but is not limited to the aforementioned division, as long as corresponding functions can be implemented; besides, specific names of the functional units are intended to distinguish them from each other, rather than to limit the protection scope of the present invention.

Figure 9:
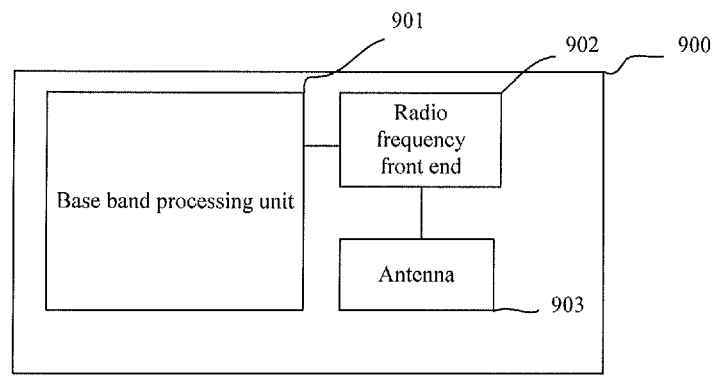
FIG. 9 is a structural diagram of a base station according to another embodiment of the present invention.

Besides, please refer to FIG. 9, an embodiment of the present invention also provides a base station, and the base station 900 includes:

A base band processing unit 901, which performs base band signal processing, and executes:
 generating cell-specific reference signals CRSs;
 generating a positioning reference signal PRS.

Figure 10:
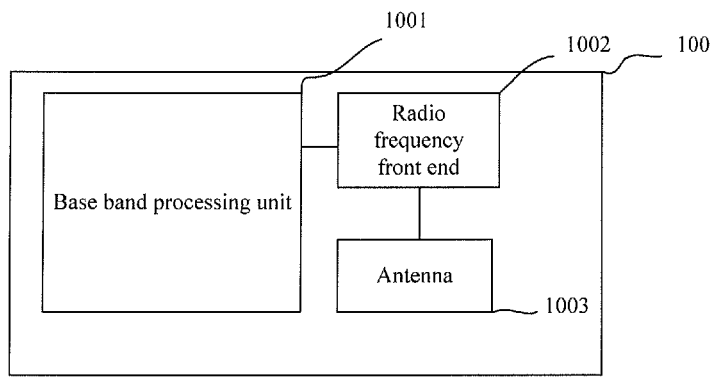
FIG. 10 is a structural diagram of a user equipment according to another embodiment of the present invention.

A radio frequency front end 902 and an antenna 903, configured to modulate a base band signal to a carrier frequency, transmit on an antenna port, and execute:
 transmitting the PRS on a port used for transmitting a CRS;
 transmitting the CRSs on one or more ports used for transmitting the CRSs;

Please refer to FIG. 10, an embodiment of the present invention also provides a user equipment, the user equipment 100 includes:

A base band processing unit 1001, which performs base band signal processing, and executes:
 generating a local PRS and a local CRS which are transmitted within a PRS bandwidth on the port;
 correlating the received PRS with the local PRS to obtain a first correlation value, correlating the received CRSs with the local CRS to obtain a second correlation value, and performing measurement of a reference signal time difference according to the first correlation value and the second correlation value;

A radio frequency front end 1002 and an antenna 1003, configured to demodulate a signal received on a receiving antenna port to a base band signal, and execute:
 receiving a positioning reference signal subframe, where the positioning reference signal subframe includes a PRS transmitted on a port used for transmitting a CRS, and CRSs transmitted on one or more ports used for transmitting the CRSs.

It may be further known by skilled persons that, the units and the algorithm steps of each example described with reference to the embodiments disclosed herein may be implemented by electronic hardware, computer software, or a combination of the both. In order to clearly describe the interchangeability of the hardware and the software, the constitution and the steps of each example have been generally described according to the functions in the foregoing description. Whether these functions are performed by hardware or software depends on design constraints and specific application of the technical solutions. Skilled persons may use different methods to implement the described functions for each specific application, but such implementation should not be regarded as going beyond the scope of the present invention.

The steps of the methods or algorithms described with reference to the embodiments disclosed herein may be implemented by hardware, a software module executed by a processor, or a combination of the both. The software module may be disposed in a random access memory (RAM), a memory, a read-only memory (ROM), an electrically programmable ROM, an electrically erasable and programmable ROM, a register, a hard disk, a removable magnetic disk, a CD-ROM, or any other storage medium well known in the art.

The objectives, technical solutions, and beneficial effects of the present invention have been described in details in the above embodiments. It should be noted that, the above descriptions are merely embodiments of the present invention, but are not intended to limit the protection scope of the present invention. Any modification, equivalent replacement, or improvement made without departing from the spirit and principle of the present invention should fall within the protection scope of the present invention.

What is claimed is:

1. A method for terminal positioning, wherein the method comprises:
   receiving by a user terminal, a positioning reference signal subframe from a base station, wherein the positioning reference signal subframe comprises cell-specific reference signals (CRSs) transmitted on at least two ports used for transmitting the CRSs, and a positioning reference signal (PRS) transmitted on one of the at least two ports used for transmitting the CRSs;
   generating by the user terminal, a local PRS and a local CRS which are transmitted within a PRS bandwidth on one of the at least two ports used for transmitting the CRSs;
   correlating by the user terminal, the received PRS with the local PRS to obtain a first correlation value, correlating the received CRSs with the local CRS to obtain a second correlation value, and performing measurement of a reference signal time difference according to the first correlation value and the second correlation value;
   wherein the measurement of a reference signal time difference comprises:
   correlating the received PRS with the local PRS within a same subframe, and correlating the received CRSs with the local CRS within the same subframe;
   accumulating complex correlation results within the same subframe;
   performing a square operation processing on the complex correlation result within the same subframe;
   accumulating square operation processing results of multiple subframes;
   obtaining a peak value location according to the square operation processing results;
   obtaining a reference signal arrival time of a cell according to the peak value location;
   obtaining a reference signal arrival time difference according to the reference signal arrival times of multiple cells.

2. The method for terminal positioning according to claim 1, wherein the correlating the received CRSs with the local CRS to obtain a second correlation value specifically comprises:
   correlating a part of the received CRSs transmitted in a region which is outside a control channel region with a part of the local CRS transmitted in the region which is outside the control channel region, to obtain the second correlation value.

3. The method for terminal positioning according to claim 1, further comprising:
   receiving a measuring assisting message sent by a network side, to acquire, according to the measuring assisting message, a correspondence of a base station between a port for transmitting the PRS and a port for transmitting a CRS.

4. A base station, comprising a first processor which executes instruction codes stored in a first non-transitory computer readable storage medium to perform:
   generating cell-specific reference signals (CRSs);
   generating a positioning reference signal (PRS);
   wherein the base station comprises a second processor which executes instruction codes stored in a second non-transitory computer readable storage medium to perform:
   transmitting the CRSs on one or more ports used for transmitting the CRSs to a user terminal; and transmitting the PRS on one of the one or more ports used for transmitting the CRSs to the user terminal, so that the user terminal receives the CRSs and the PRS, generates a local PRS and a local CRS which are transmitted within a PRS bandwidth on one of the one or more ports used for transmitting the CRSs, correlates the received PRS with the local PRS to obtain a first correlation value and correlates the received CRSs with the local CRS to obtain a second correlation value, and performing measurement of a reference signal time difference according to the first correlation value and the second correlation value;
   wherein the measurement of a reference signal time difference comprises:
   correlating the received PRS with the local PRS within a same subframe, and correlating the received CRSs with the local CRS within the same subframe;
   accumulating complex correlation results within the same subframe;
   performing a square operation processing on the complex correlation result within the same subframe;
   accumulating square operation processing results of multiple subframes;
   obtaining a peak value location according to the square operation processing results;
   obtaining a reference signal arrival time of a cell according to the peak value location;
   obtaining a reference signal arrival time difference according to the reference signal arrival times of multiple cells.

5. The base station according to claim 4, wherein the PRS is transmitted on port 0.

6. A user equipment, comprising a first processor which executes instruction codes stored in a first non-transitory computer readable storage medium to perform:
   receiving a positioning reference signal subframe, wherein the positioning reference signal subframe comprises cell-specific reference signals (CRSs) transmitted on at least two ports used for transmitting the CRSs, and a positioning reference signal (PRS) transmitted on one of the at least two ports used for transmitting the CRSs;
   wherein the user equipment comprises a second processor which executes instruction codes stored in a second non-transitory computer readable storage medium to perform:
   generating a local PRS and a local CRS which are transmitted within a PRS bandwidth on the one of the at least two ports used for transmitting the CRSs;
   correlating the received PRS with the local PRS to obtain a first correlation value, and correlating the received CRSs with the local CRS to obtain a second correlation value, and performing measurement of a reference signal time difference according to the first correlation value and the second correlation value;
correlating the received PRS with the local PRS within a same subframe, and correlate the received CRSs with the local CRS within the same subframe;
accumulating complex correlation results within the same subframe;
performing a square operation processing on the complex correlation result within the same subframe;
accumulating square operation processing results of multiple subframes;
obtaining a peak value location according to the square operation processing results;
obtaining a reference signal arrival time of a cell according to the peak value location; and
obtaining a reference signal arrival time difference according to the reference signal arrival times of multiple cells.

7. The user equipment according to claim 6, wherein the second processor is further configured to correlate a part of the received CRSs transmitted in a region which is outside a control channel region with a part of the local CRS transmitted in the region which is outside the control channel region, to obtain the second correlation value.

8. The user equipment according to claim 6, wherein the first processor performs:
receiving a measuring assisting message sent by a network side,
acquiring, according to the measuring assisting message, a correspondence of a base station between a port for transmitting the PRS and a port for transmitting a CRS.

* * * * *